US009719792B2

(12) United States Patent
Barth

(10) Patent No.: US 9,719,792 B2
(45) Date of Patent: Aug. 1, 2017

(54) COLLECTIVE VEHICLE TRAFFIC ROUTING

(71) Applicant: Google Inc., Mountain View, CA (US)

(72) Inventor: David M. Barth, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/392,164

(22) Filed: Dec. 28, 2016

(65) Prior Publication Data

US 2017/0122759 A1    May 4, 2017

Related U.S. Application Data

(63) Continuation of application No. 14/635,685, filed on Mar. 2, 2015, which is a continuation of application No. 12/757,178, filed on Apr. 9, 2010, now Pat. No. 8,972,171.

(51) Int. Cl.
*G01C 21/34* (2006.01)
*G01C 21/36* (2006.01)

(52) U.S. Cl.
CPC ..... *G01C 21/3492* (2013.01); *G01C 21/3658* (2013.01); *G01C 21/3667* (2013.01); *G01C 21/3694* (2013.01)

(58) Field of Classification Search
CPC .................. G01C 21/3492; G01C 21/3658
See application file for complete search history.

(56) References Cited

U.S. PATENT DOCUMENTS

| 2005/0131643 A1 | 6/2005 | Shaffer et al. |
| 2005/0222750 A1 | 10/2005 | Tsuge et al. |
| 2010/0185382 A1 | 7/2010 | Barker et al. |

*Primary Examiner* — Basil T Jos
(74) *Attorney, Agent, or Firm* — Dority & Manning, P.A.

(57) ABSTRACT

A system and method provides a route and turn-by-turn directions based on estimates of current and future traffic along the route. A client device may request turn-by-turn directions between an initial and a final location. A server may identify a plurality of routes between the locations. Each route of the plurality of routes may be divided into route segments. For each route segment of a particular route, the server may estimate a travel time. The travel time may be based on estimated vehicle volume data generated from information received from other users vehicle Based on the estimated travel time for each route segment of a particular route, the server may estimate a total travel time for the particular route. The server may repeat this estimate for each of the plurality of routes between the locations and select the route with the lowest estimated travel time. Based on the selected route, the server may generate turn-by-turn directions and transmit the directions to the client device for display.

20 Claims, 9 Drawing Sheets

COLLECTIVE VEHICLE TRAFFIC ROUTING

BACKGROUND OF THE INVENTION

Various navigation systems provide users with turn-by-turn directions. These systems include handheld GPS devices or mobile phones, vehicle-mounted devices, or Internet-based computers with access to applications such as Google Maps. Users input one or more locations and receive a route and turn-by-turn directions. Generally, these systems generate turn-by-turn directions based on static map data, for example, routing users along the biggest roadways or roads with the highest speed limits. These systems may select the fastest route based on the shortest estimated time to travel along the route. Some systems may incorporate traffic conditions, for example reports of congestion, into this calculation. The user may follow the turn-by-turn directions to reach the one or more locations.

Each user requesting turn-by-turn directions is thus provided with the "fastest route" at the time the request is made. However, the actual travel time along the route may vary depending on the accuracy and extent of the traffic information. Traffic conditions may be very time sensitive, that is, the current level of traffic at a particular location may change by the time the user gets to that location. In another example, if a large number of users request turn-by-turn directions between the same two locations, these systems provide the same turn-by-turn directions to each user. Thus, these systems may actually generate additional traffic and the selected route may no longer be the fastest route between the two locations by the time the user is actually on the road.

BRIEF SUMMARY OF THE INVENTION

The present invention relates generally to routing vehicles to balance the relative traffic on different roads, or on different routes to the same destination. More specifically, the invention relates to providing routes and turn by turn directions based on estimates of current and future traffic along the routes.

An aspect of the invention provides a method of providing turn-by-turn directions to a device on a network. The method includes receiving, from a device, a request for turn-by-turn directions including an initial location and a final location; determining, by a server device, a plurality of routes between the initial location and the final location, wherein each of the plurality of routes is associated with a plurality of route segments; for each particular route segment of the plurality of route segments, estimating a total time of travel based on an estimated travel time for each of the plurality of route segments associated with the particular route, wherein the estimated travel time for the particular route segment is based on vehicle volume data associated with the particular route segment, and wherein the vehicle volume data includes estimates of the present volume of traffic and future volume of traffic along the associated route segment; selecting a shortest route of the plurality of routes based on the estimated total time of travel for each of the plurality of route segments; generating turn-by-turn directions based on the selected shortest route; and transmitting, by the server device to the client device, the turn-by-turn directions to the client device.

In one example, the method further includes receiving, by the server, a second request for turn-by-turn directions from a second client device; selecting a second route based on the second request, wherein the second location is associated with a second plurality of second route segments; estimating a plurality of time periods during which the second client device will be located along each of the second plurality of route segments; and updating the vehicle volume data based on the plurality of time periods.

In another example, the vehicle volume data includes estimates of the present volume of traffic and future volume of traffic along the associated route segment for each of a plurality of time periods.

In another example, the vehicle volume data further includes an optimum capacity for the associated route segment.

In another example, the vehicle volume data further includes estimates of the present volume of traffic and future volume of traffic along a particular lane of the associated route segment.

In another example, the client device is a portable computer.

In another example, the client device is a mobile phone.

In another example, the vehicle volume data is updated based on travel information associated with a plurality of different client devices, the information including the current location, destination, and route to the destination for each client device of the plurality of different client devices. In one alternative, the method further includes identifying the travel information based on requests received from each client device of the plurality of different client devices. In another alternative, the method further includes automatically receiving the travel information from each particular client device of the plurality of client devices independent of a request for turn-by-turn directions from each particular client device.

In another example, the vehicle volume data is based on a plurality of requests for turn-by-turn directions received from a plurality of different client devices.

Another aspect on the invention provides a device. The device includes memory for storing route segments wherein a route segment is associated with vehicle volume data and wherein the vehicle volume data including estimates of the present volume of traffic and future volume of traffic along the associated route segment; and a processor. The processor is configured to receive, from a different device, a request for turn-by-turn directions including an initial location and a final location; determine, a plurality of routes between the initial location and the final location, wherein each of the plurality of routes is associated with a plurality of route segments of the stored route segments; for each particular route segment of the plurality of route segments, estimate a total time of travel based on an estimated travel time for each of the plurality of route segments associated with the particular route, wherein the estimated travel time for the particular route segment is based on the vehicle volume data associated with the particular route segment; select a shortest route of the plurality of routes based on the estimated total time of travel for each of the plurality of route segments; estimate a time period during which the client device will be located along each of the plurality of route segments of the selected route; and update the vehicle volume data based on the time period.

In one example, the processor is further configured to generate turn-by-turn directions based on the selected shortest route; and transmit the turn-by-turn directions to the different device.

In another example, the vehicle volume data includes estimates of the present volume of traffic and future volume of traffic along the associated route segment for each of a plurality of time periods.

In another example, the vehicle volume data further includes estimates of the present volume of traffic and future volume of traffic along a particular lane of the associated route segment.

In another example, the vehicle volume data is based on a plurality of requests for turn-by-turn directions received from a plurality of different client devices.

A further aspect of the invention provides a computer-readable medium having instructions stored thereon for operating a vehicle routing system. The instructions, when executed by a processor, cause the processor to perform a method. The method includes receiving, from a device, a request for turn-by-turn directions including an initial location and a final location; determining, by a server device, a plurality of routes between the initial location and the final location, wherein each of the plurality of routes is associated with a plurality of route segments; for each particular route segment of the plurality of route segments, estimating a total time of travel based on an estimated travel time for each of the plurality of route segments associated with the particular route, wherein the estimated travel time for the particular route segment is based on vehicle volume data associated with the particular route segment, and wherein the vehicle volume data includes estimates of the present volume of traffic and future volume of traffic along the associated route segment; selecting a shortest route of the plurality of routes based on the estimated total time of travel for each of the plurality of route segments; generating turn-by-turn directions based on the selected shortest route; and transmitting, by the server device to the client device, the turn-by-turn directions to the client device.

In one example, the computer-readable medium includes instructions which cause the processor to perform the method further including receiving, by the server, a second request for turn-by-turn directions from a second client device; selecting a second route based on the second request, wherein the second location is associated with a second plurality of second route segments; estimating a plurality of time periods during which the second client device will be located along each of the second plurality of route segments; and updating the vehicle volume data based on the plurality of time periods.

In another example, the vehicle volume data includes estimates of the present volume of traffic and future volume of traffic along the associated route segment for each of a plurality of time periods.

In another example, the car vehicle volume data further includes an optimum capacity for the associated route segment.

DETAILED DESCRIPTION

Figure 1:
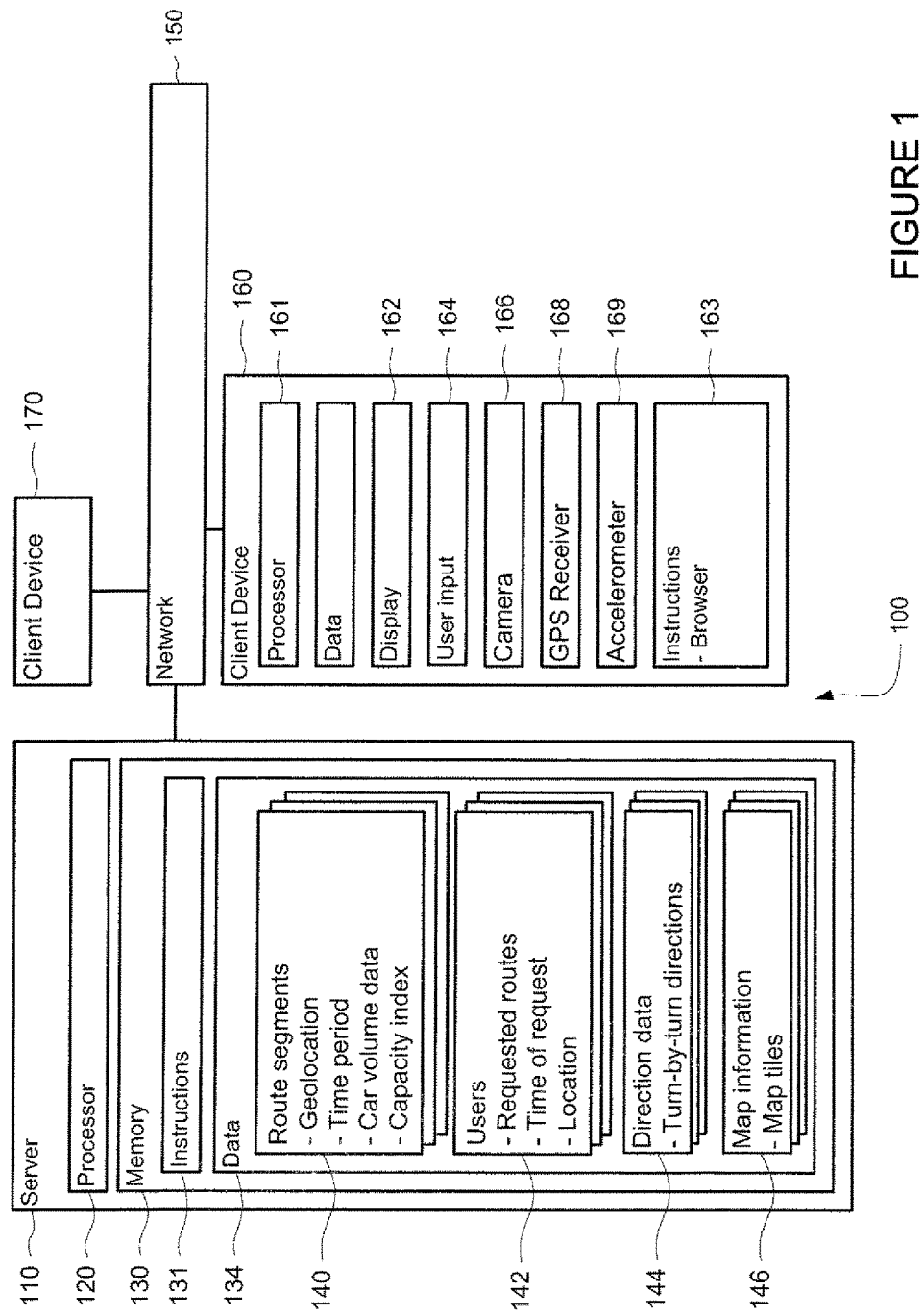
FIG. 1 is a functional diagram of a system in accordance with an aspect of the invention.
Figure 2:
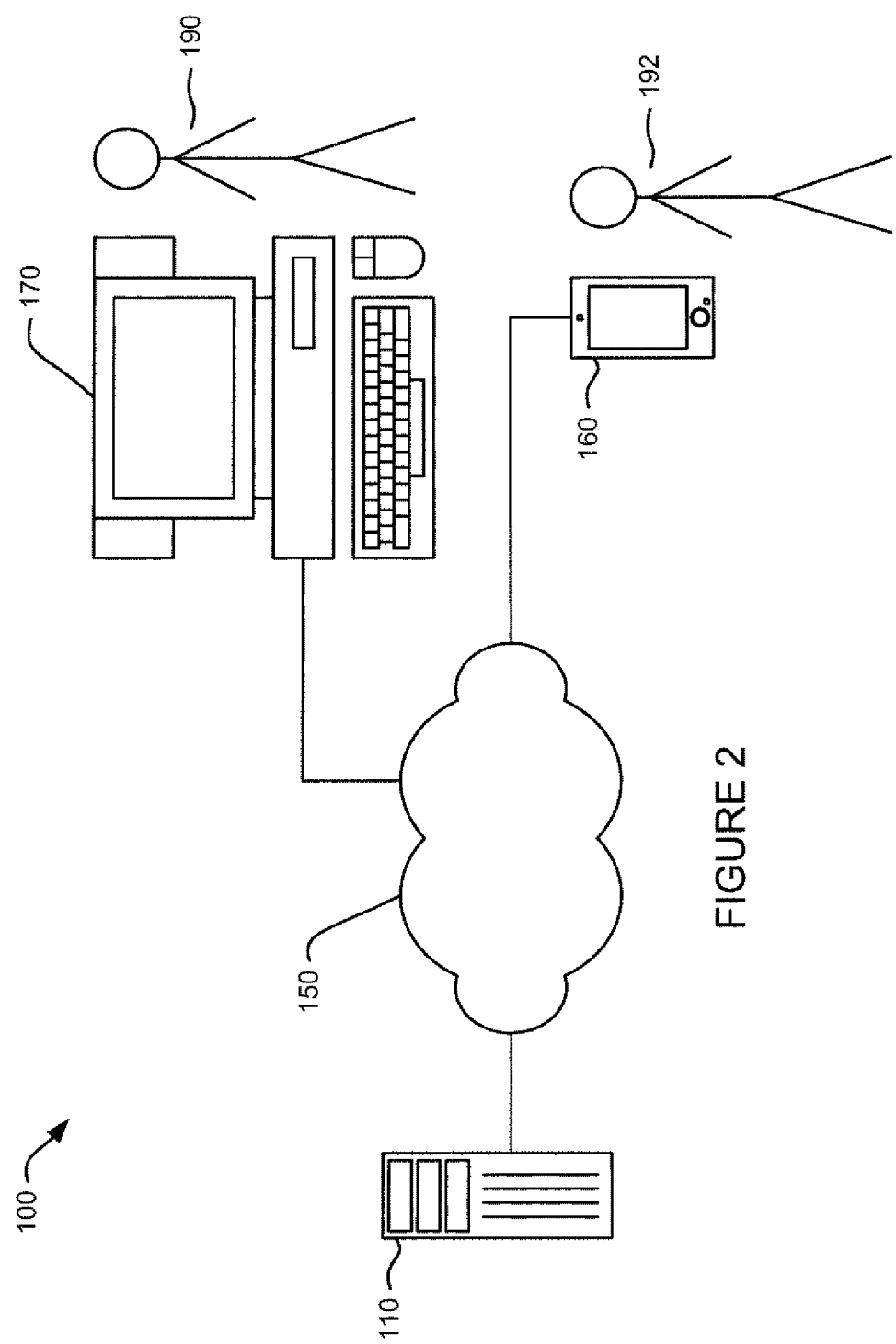
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly communicating with other nodes of the network. For example, computer 110 may comprise a web server that is capable of communicating with client devices 160 and 170 via network 150 such that server 110 uses network 150 to transmit and display information to a user 190 on display 162 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions. Each client device 160 or 170 may be a personal computer intended for use by a person 190-192, and have all of the components normally used in connection with a personal computer such as a central processing unit (CPU) 162, memory (e.g., RAM and internal hard drives) storing data and instructions 163 including a web browser, an electronic display 162 (e.g., a monitor having a screen, a small LCD touch-screen, a projector, a television, a computer printer or any other electrical device that is operable to display information), user input 164 (e.g., a mouse, keyboard, touch-screen or microphone), camera 166, speakers, a network interface device, and all of the components used for connecting these elements to one another.

The client devices may also include a geographic position component 168, such as circuits, to determine the geographic location and orientation of the device. For example, client device 170 may include a GPS receiver to determine the device's latitude, longitude and altitude position. In another example, the geographic position component may also comprise software for determining the position of the device based on other signals received at the client device 170, such as signals received at a cell phone's antenna from one or more cell phone towers if the client device is a cell phone. In still another example, geographic position component may detect all WiFi networks in the vicinity, measure the strength of the signal from those networks, and use a table of WiFi access point locations to triangulate the geographic position of the client device. It will be understood that any number of geographic positioning systems, alone or in combination, may be used.

Client devices may also include an accelerometer 169 or gyroscope to determine the direction in which the device is oriented. By way of example only, the device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard, a keypad or a touch screen. Indeed, computers in accordance with the systems and methods described herein may comprise any device capable of processing instructions and transmitting data to and from humans and other computers including general purpose computers, and network computers lacking local storage capability Although certain advantages are obtained when information is transmitted or received as noted above, aspects of the invention are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

Returning to FIG. 1, data 134 may include route segment data 140. Each route segment may be associated with one or more geographical locations. A given route between locations may comprise a plurality of route segments. Route segments may be based on stretches of road between intersections, changes in road names, on turn instructions for the particular determined route, or any other useful method. For example, if the route between location A and location C requires a turn at location B, the route consists of two route segments, the segment A-B and the segment B-C. Each segment may be associated with one or more turn-by-turn directions.

Route segment data 140 may also include vehicle capacity index data. For example, each route segment may be associated with a capacity index representing the capacity of the route segment relative to other route segments. The capacity index may describe how the speed of traffic along a particular route segment varies relative to other route segments depending on the volume of cars on the route segment at any given time. For example, a highway with two lanes may have roughly double the capacity index of a highway with one lane. This may indicate that the addition of a single vehicle on the two-lane highway would impact, for example, by slowing down the speed of traffic roughly half as much as the addition of a single vehicle on the one-lane highway. In another example, assuming that traffic lights are more efficient at moving traffic, an arterial road with a stop sign may have a lower capacity index than an arterial road with a traffic light. Thus, the capacity index is an attribute of the route segment and is independent of the number cars are on the road.

The examples described are above are simplified examples demonstrating a linear capacity index assigned to each road, however, it will be understood that in a practical implementation the capacity index is likely to require sophisticated calculations to convert traffic volume to relative speed. In another example, the capacity index may change over time, for example, if the attributes of the route segment changed, such as the number of lanes, or if the timing of traffic signals changed. vehicle vehicle vehicle vehicle vehicle The capacity index for a particular route segment may be determined based on observation of the particular route segment over time. For example, the capacity index may be determined by observing the impact on traffic speeds as additional people try to join traffic on a route segment, building a model for each route segment that correlates traffic speed with observed number of users driving on the road. Through such observation the capacity index may be used to predict the impact on traffic speeds for a particular route segment each time an additional vehicle enters or leaves the flow of traffic.

Route segments 140 may also be associated with vehicle volume data. For example, time period information may include a table, database, or other arrangement of data which includes a current estimate of the number of vehicles expected to be on a particular route segment within a specified time period. Time periods may be defined as a time interval, for example, 1 minute or 5 minute periods into the future. The time period data may be updated continuously as the server sends and receives information. The table, capacity index, and vehicle volume data may be used to estimate the amount of time required for a vehicle to travel a road segment at some time in the future.

user data 142 identifies information associated with users of the systems, i.e., any entity that interacts with the systems or methods such as people or businesses. For example a particular user may request turn-by-turn directions. As will be described in more detail below, information regarding the particular user's request such as the route or routes requested by the user, the time of the requests, and an estimated location of the user may be included in user data 142.

The system may also include direction data 144 for generating turn-by-turn directions based on a plurality of route segments. Turn-by-turn directions may include text instructions, audio instructions, and maps. Each turn-by-turn direction and associated route segment may be further associated with one or more map tiles such that each turn-by-turn direction displayed with the one or more map tiles. It will be understood that turn-by-turn directions are not limited to instructions to make simple turns, for example, other directions may include continuing on a road, taking a particular exit, etc.

Server 110 may store map-related information 146, at least a portion of which may be transmitted to a client device. For example and as shown in FIG. 1, the server may store map tiles, where each tile comprises a map image of a particular geographic area. A single tile may cover an entire region such as a state in relatively little detail and another tile may cover just a few streets in high detail. In that regard, a single geographic point may be associated with multiple tiles, and a tile may be selected for transmission based on the desired level of zoom. The map information is not limited to any particular format. For example, the images may comprise street maps, satellite images, or a combination of these, and may be stored as vectors (particularly with respect to street maps) or bitmaps (particularly with respect to satellite images).

The various map tiles are each associated with geographical locations, such that the server 110 and/or client device are capable of selecting, retrieving, transmitting, or displaying one or more tiles in response to receiving one or more geographical location.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying geographic locations (e.g., lot and block numbers on survey maps). Moreover, a location may define a range of the foregoing. The system and method may further translate locations from one reference system to another. For example, the client 170 may employ or access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, 122.083939)). In that regard, it will be understood that exchanging or processing locations expressed in one reference system, such as street addresses, may also be received or processed in other reference systems as well.

In addition to the operations described below and illustrated in the figures, various operations in accordance with a variety of aspects of the invention will now be described. It should be understood that the following operations do not have to be performed in the precise order described below. Rather, various steps can be handled in reverse order or simultaneously.

Figure 3:
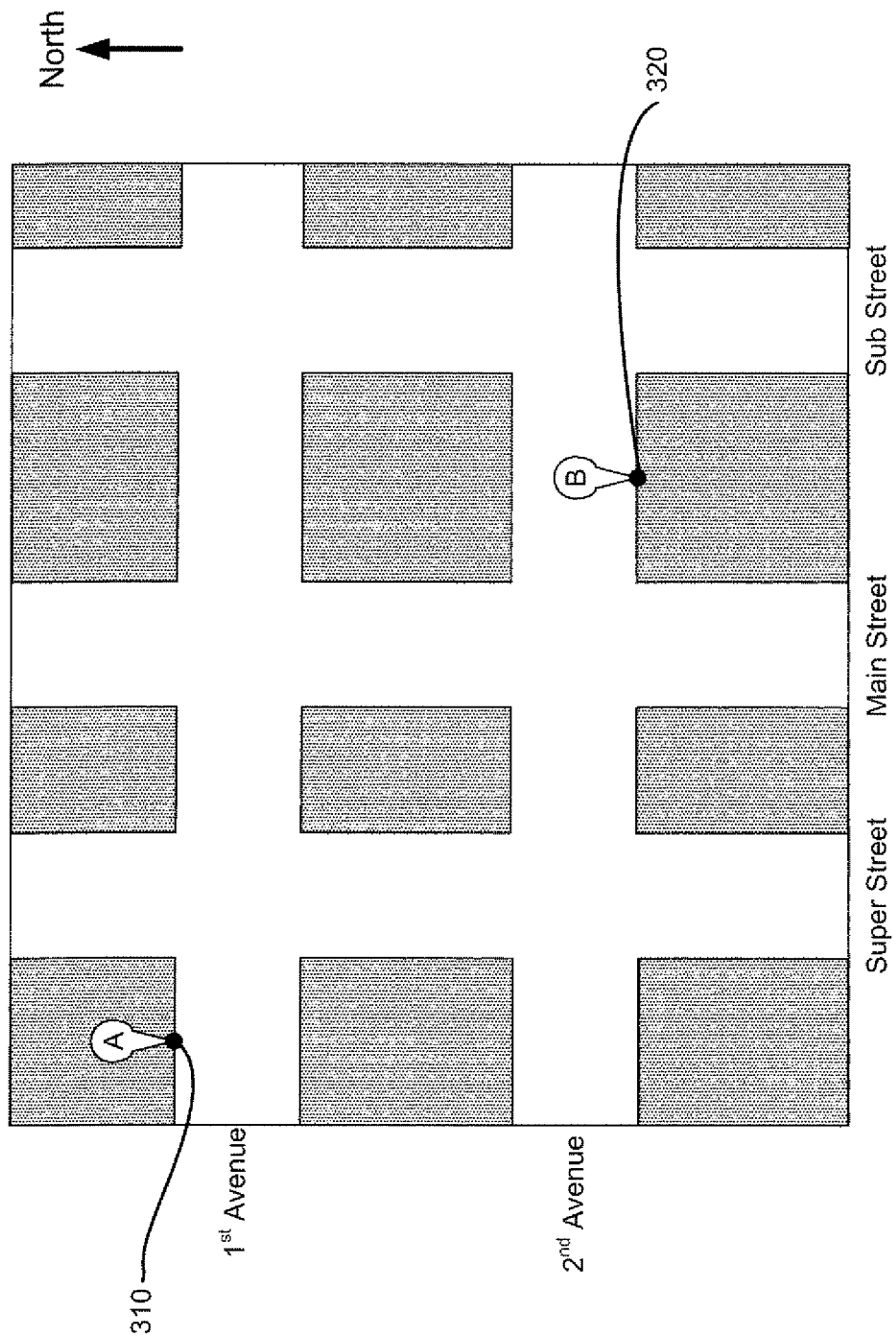
FIG. 3 is a diagram of a street grid in accordance with an aspect of the invention.

A client device may transmit a request for turn-by-turn directions between two or more locations. For example, as shown in FIG. 3, a user may identify an initial location A 310 and a final location B 320, or, in another example, the user may identify a final location and the client device may determine the initial location, for example GPS coordinates. As noted above, locations may be provided in any number of forms including street addresses, points of interest, or GPS coordinates. Location A may be located, for example, at 50 1st Avenue while location B may be located, for example, at 250 2nd Avenue.

Figure 4:
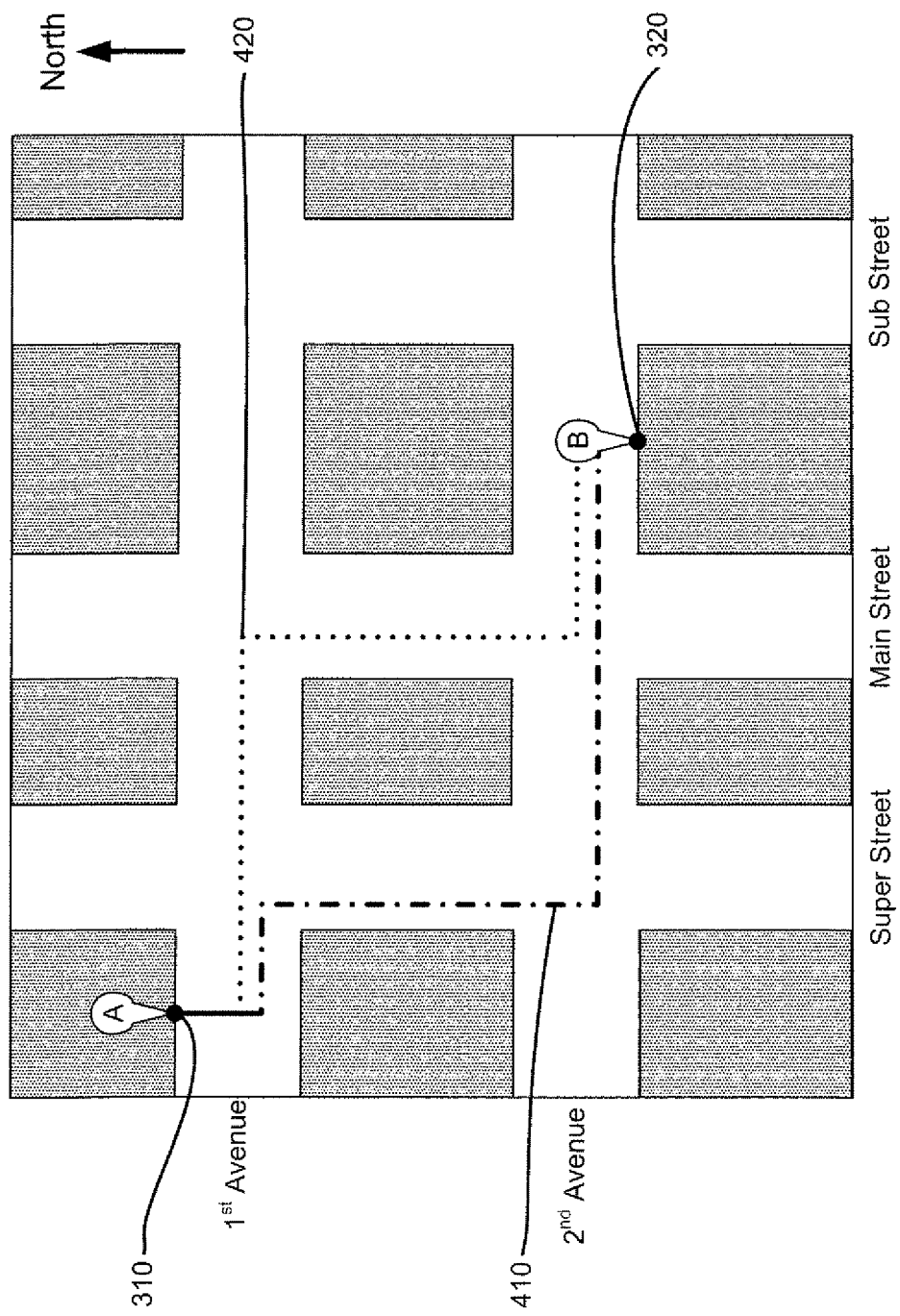
FIG. 4 is a diagram of a street grid in accordance with an aspect of the invention.

In response to receiving the locations, a server may determine possible routes between the received locations. As shown in FIG. 4, the server may identify two possible routes between location A and location B. Route 410 includes moving east along $1^8$ Avenue, turning south (right) onto Super Street and turning east (left) onto 2nd Avenue. Route 420, includes moving east along 1st Avenue, turning south (right) onto Main Street, and turning east (left) onto 2nd Avenue. It will be understood that while the example only includes two routes, the server may identify any number of routes between the locations.

Figure 5:
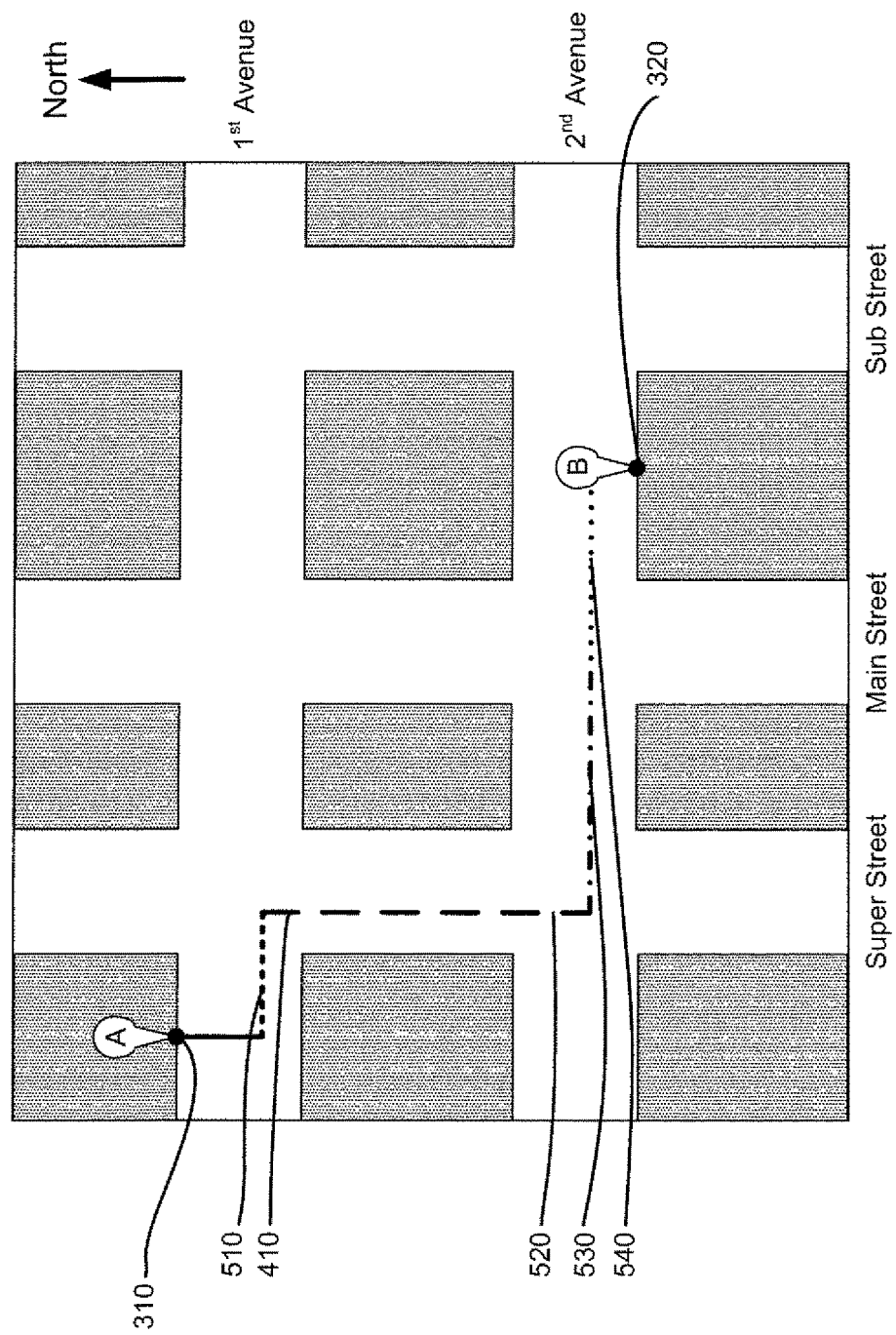
FIG. 5 is a diagram of a street grid in accordance with an aspect of the invention.

Each of routes 410 and 420 may include one or more route segments. For example, as shown in FIG. 5, route 1 410 consists of route segment 510 between 50 $1^{st}$ Avenue and the intersection of 1st Avenue and Super Street, route segment 520 between the intersection of Super Street and 1st Avenue and the intersection of Super Street and 2nd Avenue, route segment 530 2nd Avenue and the between the intersection of Super Street and intersection of Main Street and 2nd Avenue, and route segment 540 between the intersection of Main Street and 2nd Avenue and 250 2nd Avenue.

Figure 6:
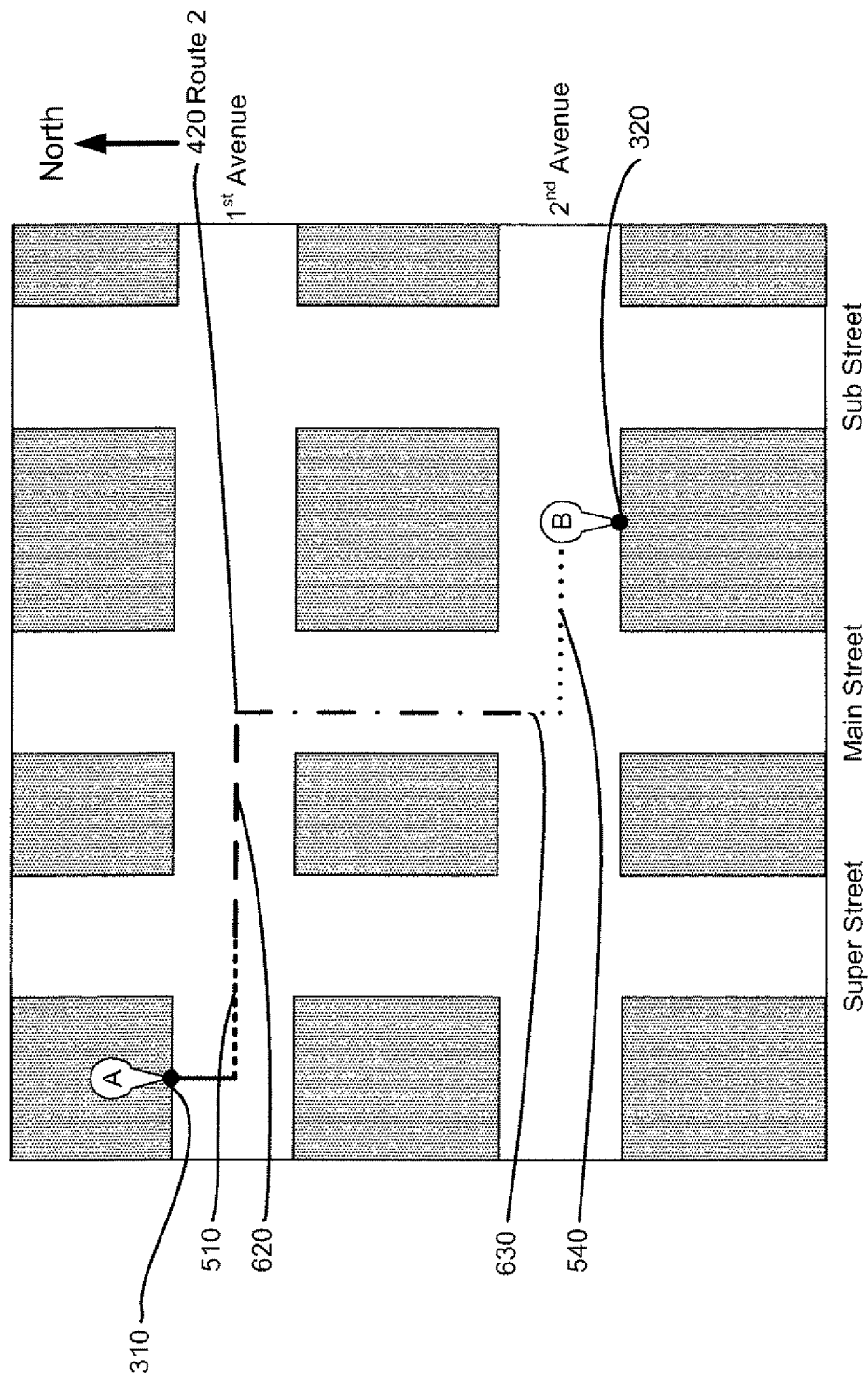
FIG. 6 is a diagram of a street grid in accordance with an aspect of the invention.

Similarly, as shown in FIG. 6, route 1 420 consists of route segment 510 between 50 1st Avenue and the intersection of 1st Avenue and Super Street, route segment 620 between the intersection of Super Street and 1st Avenue and the intersection of Main Street and 1st Avenue, route segment 630 between the intersection of Main Street and 1st Avenue and the intersection of Main Street and 2nd Avenue, and route segment 540 between the intersection of Main Street and 2nd Avenue and 250 2nd Avenue.

Returning to route 410, server may identify the four route segments 510, 520, 530, and 540. For each segment of route 410, the server may calculate an estimated drive time for the route under expected traffic conditions. For example, the process may begin by estimating that the user will leave location A for location B immediately. Thus, user A would be moving along route segment 510 at the present time. The server determines from the time period information associated with route segment 510 the estimated number of vehicles that are located along route segment 510 at the present time. Using the estimated number of vehicles and the capacity index, the server may determine an approximate time of travel along route segment 510.

The server will determine the approximate time of travel along the next route segment based on the approximate time of travel of the previous route segment. For example, if the server determines that it will take approximately 2 minutes to move along route segment 510 and get to route segment 520, the server will determine from the time period information associated with route segment 520, the estimated number of vehicles that will be located along route segment 520 2 minutes from the present time. Using the estimated number of vehicles and the capacity index, the server may determine an approximate time of travel along route segment 520. The server may repeat the process described above for route segments 530 and 540.

Once the server has determined the estimated travel time for each route segment of a route, the server may determine the estimated travel time for the entire route. For example, the estimated travel time for route 410 may be the sum of the estimated travel times for each of route segments 510, 520, 530, and 540. Similarly, the server may determine the estimated travel time for route 420 based on the estimated travel times for each of the route segments 510, 620, 630, and 540.

The server may select a fastest route by comparing the estimated travel times of the determined routes. Thus if the estimated travel time of route 410 is less than the estimated travel time of route 420, the server will select route 410. The reverse may also be true.

The server may generate turn-by-turn directions based on the selected route and transmit the route to the client device.

Once the server has selected a fastest route, the server may update the vehicle volume data for each route segment along the fastest route. For example, if the selected route is route 410, the server may estimate that an additional vehicle may be moving along route segment 510 presently and an additional vehicle may be moving along route segment 520 2 minutes in the future. The server may make similar estimations for the remaining route segments, 530 and 540, of route 410.

This information may be incorporated into the time period information associated with each route segment. Thus, the time period information associated with route segment 510 may be updated to include an additional vehicle presently, the time period information associated with route segment 520 may be updated to include an additional vehicle at a time of two minutes into the future, etc.

When the server receives a new request for a route, the server may use the updated vehicle volume data to identify a new fastest route. For example, if the server receives a new request for a route and the potential route includes route segment, for example 520, the server may estimate that if a potential route would require a vehicle to move along route segment 520 2 minutes in the future, the additional vehicle moving along route segment 520 at that time may increase the estimated travel time along route segment 520. The server may determine that at the time of the new request, route 410 is no longer the fastest route and identify a different route, for example, route 420 as the fastest route.

Figure 7:
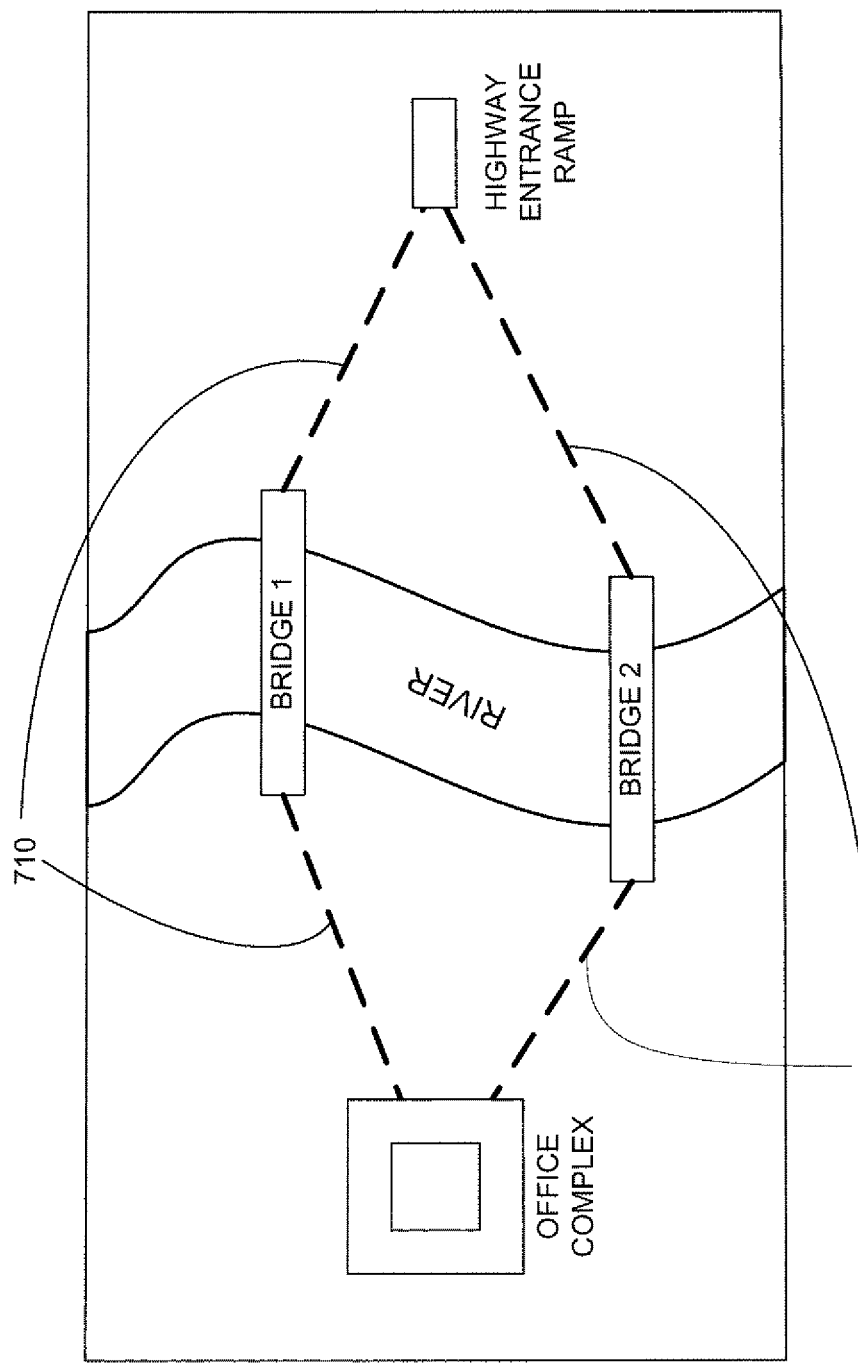
FIG. 7 is a diagram of a river with multiple crossings in accordance with an aspect of the invention.

FIG. 7 depicts a further example. Here, the server may receive requests at around 5:00 p.m. for a route between an office complex and a highway entrance ramp. In the example, the average drive time along route 710 over bridge 1 and along route 720 over bridge 2 may be equal, and it may take an estimated 10 minutes for a vehicle to reach bridge 1 from the office complex. If in the example, bridge 1 has slightly less traffic than bridge 2 at the time period of 5:10 p.m. when the requesting user may be crossing the bridge, the server may recommend route 710. The server may determine that based on the received request and an assumption that the user will follow the recommended route 710, leaving immediately and arriving at the bridge at 5:10 p.m., the traffic along bridges 1 and 2 at time period of 5:10 may be about equal. Accordingly, additional requests for the route may be routed either along route 710 or route 720.

Figure 8A:
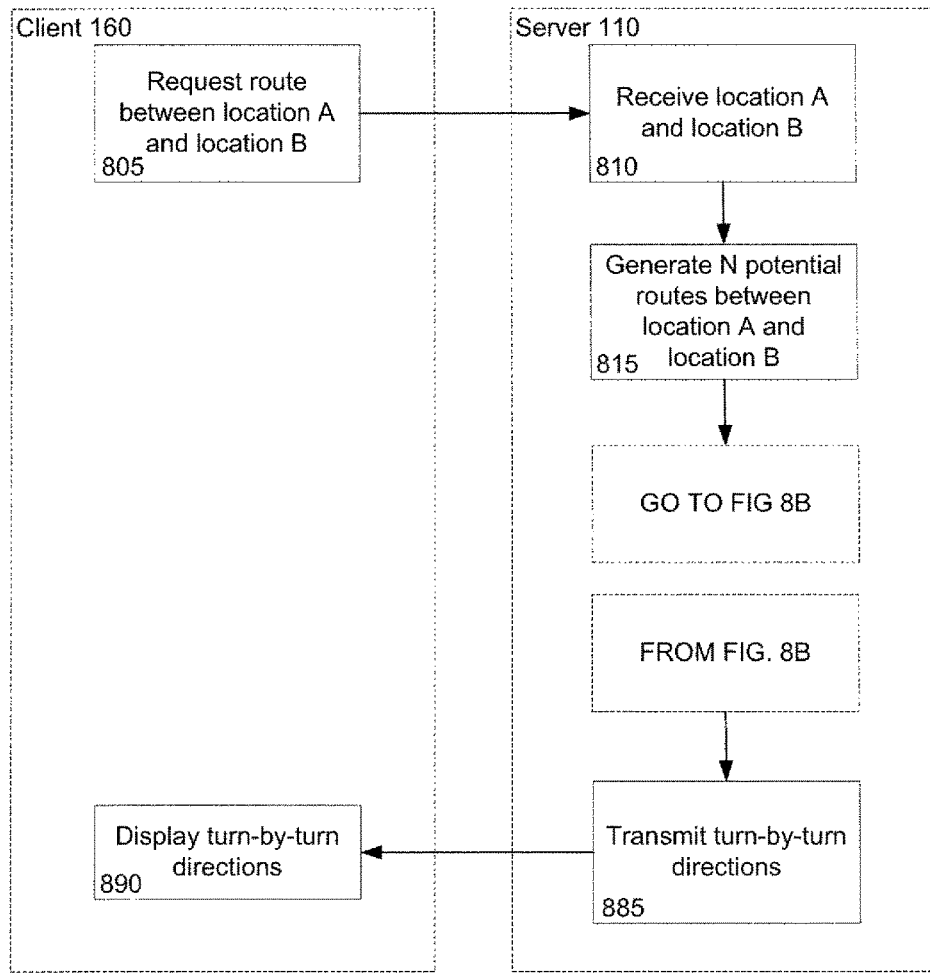
FIGS. 8A and 8B are a flow diagram in accordance with an aspect of the invention.
Figure 8B:
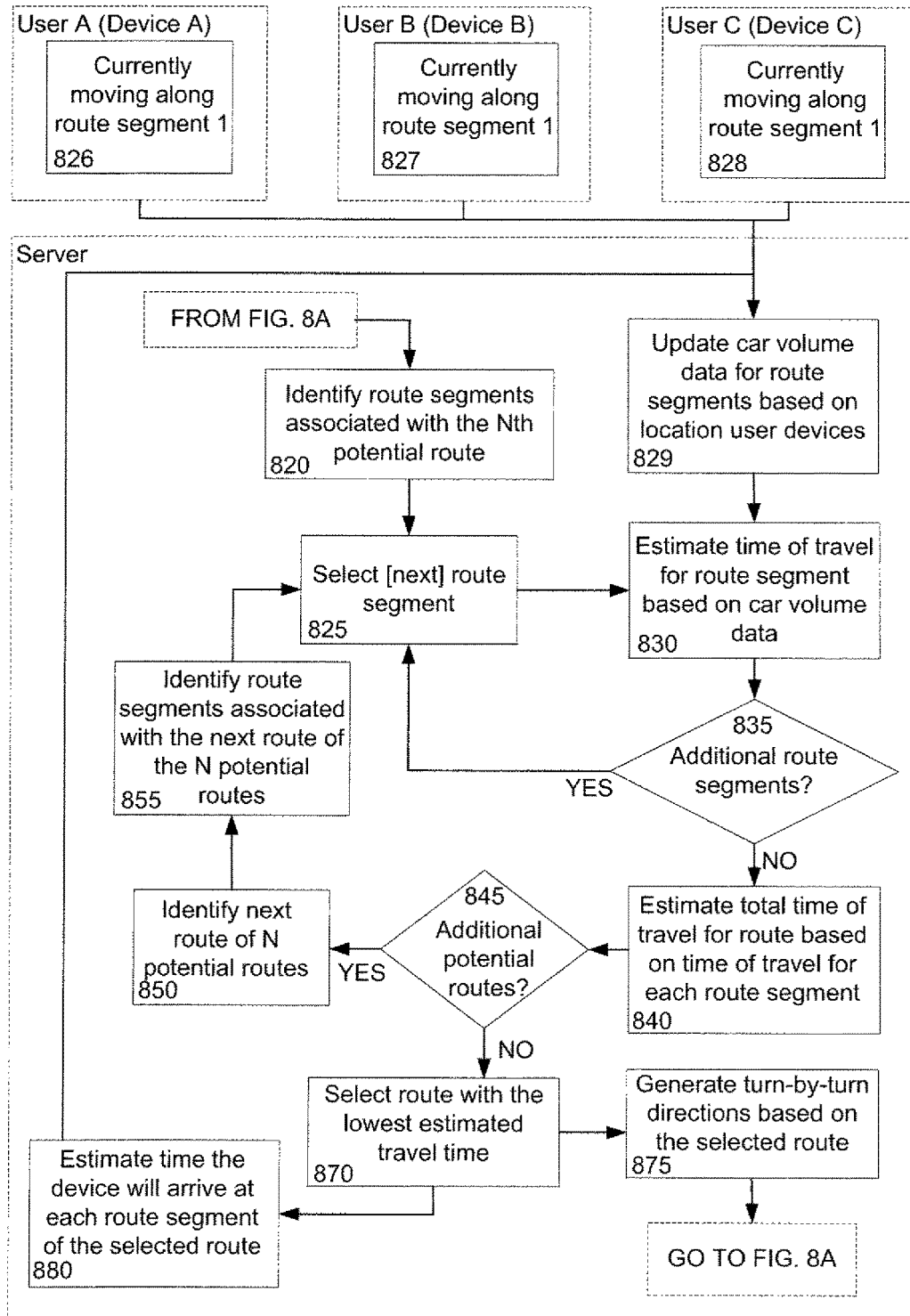

As shown in FIGS. 8A and 8B, a client device may request a route between locations and display turn-by-turn directions. For example, client 160 may request a route between location A and location B, as shown in block 805. Then at block 810, server 110 may receive the locations and generate N potential routes between location A and location B, as shown in block 815. At block 820 of FIG. 8B [The block before 820 in FIG. 8B still says "FROM FIG. 7A" it should say "FROM FIG. 8A"], server 110 may identify route segments associated with the Nth potential route. Then at block 825, the server 110 may select a route segment of the route segments identified at block 820. For the selected route segment, server 110 may estimate the time of travel, as shown in block 830. This estimate may be based on vehicle volume data for the particular route segment at a particular time generated from the estimated location of other users A, B, and C at blocks 826-829 at the particular time. It will be understood that as the current locations of the various users A, B, and C change, the car volume data may be updated accordingly. Thus, the travel time for the particular route segment may be predicted based on what the volume on that route segment will be in the future (e.g. when client 160 would arrive to a route segment being considered).

As shown in block 835, if there are additional route segments, the server may select the next route segment of the identified route segments at block 825 and estimates a time of travel at block 830 based on the updated (and predicted) vehicle volume data from block 829.

If there are no additional route segments, server 110 estimates a total time of travel for the selected route, as shown in block 840. If there are additional potential routes at block 845, the server may identify a next route of the N potential routes, as shown in 850. Then, the server may identify route segments associated with the next route of the N potential routes. Server 110 may select a route segment of the next route at block 825 and continue at block 830.

If there are no additional potential routes at block 845, server 110 may select the route of the N routes with the lowest estimated travel time, as shown in block 870. Then at block 875, server 110 may generate turn-by-turn directions based on the selected route.

Then at block 880, server 110 may estimate the time that client device 160 may arrive at each route segment of the selected segment, for example, based on the estimated departure time of the client device and the estimated travel time for all previous route segments of the selected route. This information may be used to update the car volume data as shown in block 829.

Returning to FIG. 8A, at block 885, the server may transmit the turn-by-turn directions to client 160 to be displayed as shown in block 890.

The vehicle volume data may be continuously updated for various additional reasons. For example, if the server identifies a change in traffic speeds along a particular route segment. In another example, where the client device is portable, such as a cell phone or laptop, the device may move off the route as determined by identifying the current location of the device (e.g. by GPS coordinates) and comparing the location to the route. A new route may be calculated and the vehicle removed from the time period table associated with route segments of the old route. In a further example, the server may receive location information without a request for turn-by-turn directions from the client device. The server may determine the route segment associated with the received location information and use this information to update the time period table.

The server may provide turn-by-turn directions including lane instructions. For example, vehicle volume data may not only be associated with a particular route segment, but a given lane of a particular route segment. Server 110 may estimate a lane associated with a particular vehicle, for example, by utilizing very high-precision location georeferencing technology. In that regard, the server may estimate the total time of travel based on the estimated speed of the vehicles traveling in a particular lane. Thus, the server may provide turn-by-turn directions including instructions indicating the fastest lane of travel.

The server may determine the optimal capacity of vehicles on a given route segment and make route recommendations based at least on how close each route segment of a route is to that route segment's optimal capacity.

The server may make route recommendations based at least on the received requests for turn-by-turn directions. For example, the server may make route recommendations in order to balance the flow of vehicles along various route segments.

It will be further understood that the sample values, types and configurations of data described and shown in the figures are for illustration purposes only. In that regard, systems and methods in accordance with aspects of the invention may include different web sites, data values, data types and configurations, and may be provided and received at different times (e.g., via different web pages) and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method for providing directions, the method comprising:
   receiving, by one or more computing devices, from a first client device, a request for turn-by-turn directions including an initial location and a final location;
   determining, by the one or more computing devices, at least one route between the initial location and the final location, wherein the at least one route is associated with a plurality of route segments;
   estimating, by the one or more computing devices, for the first client device a travel time for the route, wherein the travel time is based on vehicle volume data associated with a particular lane of at least one route segment;
   generating, by the one or more computing devices, the turn-by-turn directions based on the travel time for the route, wherein the turn-by-turn directions include instructions indicating a fastest lane of travel along the route; and
   transmitting, by the one or more computing devices to the first client device, the turn-by-turn directions.

2. The computer-implemented method of claim 1, wherein the vehicle volume data comprises an estimated speed of the vehicles traveling in the particular lane.

3. The computer-implemented method of claim 1, wherein the vehicle volume data comprises estimates of a present volume of traffic and a future volume of traffic along the at least one route segment.

4. The computer-implemented method of claim 3, further comprising:
   estimating, by the one or more computing devices, a time period during which the first client device will be located along the route; and
   updating, by the one or more computing devices, the future volume of traffic based on the time period.

5. The computer-implemented method of claim 4, wherein the turn-by-turn directions comprise a map.

6. The computer-implemented method of claim 1, wherein the vehicle volume data is based on a plurality of requests for directions received from a plurality of second client devices.

7. The computer-implemented method of claim 1, wherein the client device is a portable device.

8. A computing device comprising:
   memory for storing route segments, wherein each route segment is associated with vehicle volume data; and
   one or more processors configured to:
      receive from a first client device, a request for turn-by-turn directions including an initial location and a final location;
      determine at least one route between the initial location and the final location, wherein the at least one route is associated with a plurality of route segments;
      estimate for the first client device a travel time for the route, wherein the travel time is based on vehicle volume data associated with a particular lane of at least one route segment;
      generate the turn-by-turn directions based on the travel time for the route, wherein the turn-by-turn directions include instructions indicating a fastest lane of travel along the at least one route; and
      transmit, to the first client device, the turn-by-turn directions.

9. The computing device of claim 8, wherein the vehicle volume data comprises an estimated speed of the vehicles traveling in the particular lane.

10. The computing device of claim 8, wherein the vehicle volume data comprises estimates of a present volume of traffic and a future volume of traffic along the at least route segment.

11. The computing device of claim 8, wherein the processors are further configured to:
    estimate a time period during which the first client device will be located along the at least one route; and
    update the future volume of traffic based on the time period.

12. The computing device of claim 8, wherein turn-by-turn directions comprise a map.

13. The computing device of claim 8, wherein the vehicle volume data is based on a plurality of requests for directions received from a plurality of second client devices.

14. The computing device of claim 8, wherein the client device is a mobile phone.

15. A non-transitory computer-readable medium having instructions stored thereon for operating a vehicle routing system, the instructions, when executed by one or more computing devices, cause the one or more computing devices to perform a method comprising:
- receiving from a first client device, a request for turn-by-turn directions including an initial location and a final location;
- determining at least one route between the initial location and the final location, wherein the at least one route is associated with a plurality of route segments;
- estimating for the first client device a travel time for the route, wherein the travel time is based on vehicle volume data associated with a particular lane of at least one route segment;
- generating the turn-by-turn directions based on the travel time for the at least one route, wherein the turn-by-turn directions include instructions indicating a fastest lane of travel along the at least one route; and
- transmitting, to the first client device, the turn-by-turn directions.

16. The computing device of non-transitory computer-readable medium of claim 15, wherein the vehicle volume data comprises an estimated speed of the vehicles traveling in the particular lane.

17. The computing device of non-transitory computer-readable medium of claim 15, wherein the vehicle volume data comprises estimates of a present volume of traffic and a future volume of traffic along the at least route segment.

18. The computing device of non-transitory computer-readable medium of claim 15, wherein the processors are further configured to:
- estimating a time period during which the first client device will be located along the at least one route; and
- updating the future volume of traffic based on the time period.

19. The computing device of non-transitory computer-readable medium of claim 15, wherein the turn-by-turn directions comprise a map.

20. The computing device of non-transitory computer-readable medium of claim 15, wherein the vehicle volume data is based on a plurality of requests for directions received from a plurality of second client devices.

* * * * *